United States Patent
Sakai et al.

(10) Patent No.: US 9,330,633 B2
(45) Date of Patent: May 3, 2016

(54) DISPLAY CONTROL DEVICE, METHOD, AND NON-TRANSITORY COMPUTER READABLE MEDIUM STORING PROGRAM

(71) Applicant: FUJI XEROX CO., LTD., Tokyo (JP)

(72) Inventors: Noriko Sakai, Kanagawa (JP); Toshihiro Iwafuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 50 days.

(21) Appl. No.: 14/340,197

(22) Filed: Jul. 24, 2014

(65) Prior Publication Data

US 2015/0235628 A1   Aug. 20, 2015

(30) Foreign Application Priority Data

Feb. 18, 2014   (JP) ................. 2014-028662

(51) Int. Cl.
  *G09G 5/30* (2006.01)
  *G09G 5/02* (2006.01)
  *G09G 5/10* (2006.01)
  *G06F 3/14* (2006.01)
  *G09G 3/00* (2006.01)

(52) U.S. Cl.
  CPC ................ *G09G 5/30* (2013.01); *G06F 3/1423* (2013.01); *G09G 3/002* (2013.01); *G09G 5/02* (2013.01); *G09G 5/10* (2013.01); *G09G 2320/062* (2013.01); *G09G 2320/0626* (2013.01); *G09G 2320/0666* (2013.01); *G09G 2320/0693* (2013.01); *G09G 2320/08* (2013.01)

(58) Field of Classification Search
  CPC ..... H04N 5/7408; H04N 5/57; G09G 3/3406; G09G 3/3413; G09G 2320/0233; G09G 2320/0626
  See application file for complete search history.

(56) References Cited

U.S. PATENT DOCUMENTS

| | | | |
|---|---|---|---|
| 8,648,964 B2 * | 2/2014 | Ishibashi | G09G 3/001 348/383 |
| 9,147,247 B2 * | 9/2015 | Takabayashi | G06T 7/0016 |
| 2011/0148904 A1 * | 6/2011 | Kotani | H04N 9/31 345/589 |

FOREIGN PATENT DOCUMENTS

JP   A-2010-160509   7/2010

* cited by examiner

*Primary Examiner* — Antonio A Caschera
(74) *Attorney, Agent, or Firm* — Oliff PLC

(57) ABSTRACT

A method including causing a projection apparatus that outputs projection light to a predetermined display area to project and display a first image including plural figures such that the plural figures are respectively displayed in plural positions of a projection area that is projected by the projection light, specifying a figure of which brightness value is a maximum among the displayed plural figures so as to specify a brightness center point at which the brightness value is a maximum in the projection area, and causing the projection apparatus to project and display a second image indicating the specified brightness center point.

12 Claims, 12 Drawing Sheets

11A

11A   TARGET CENTER POINT

TARGET CENTER POINT   TARGET CENTER POINT

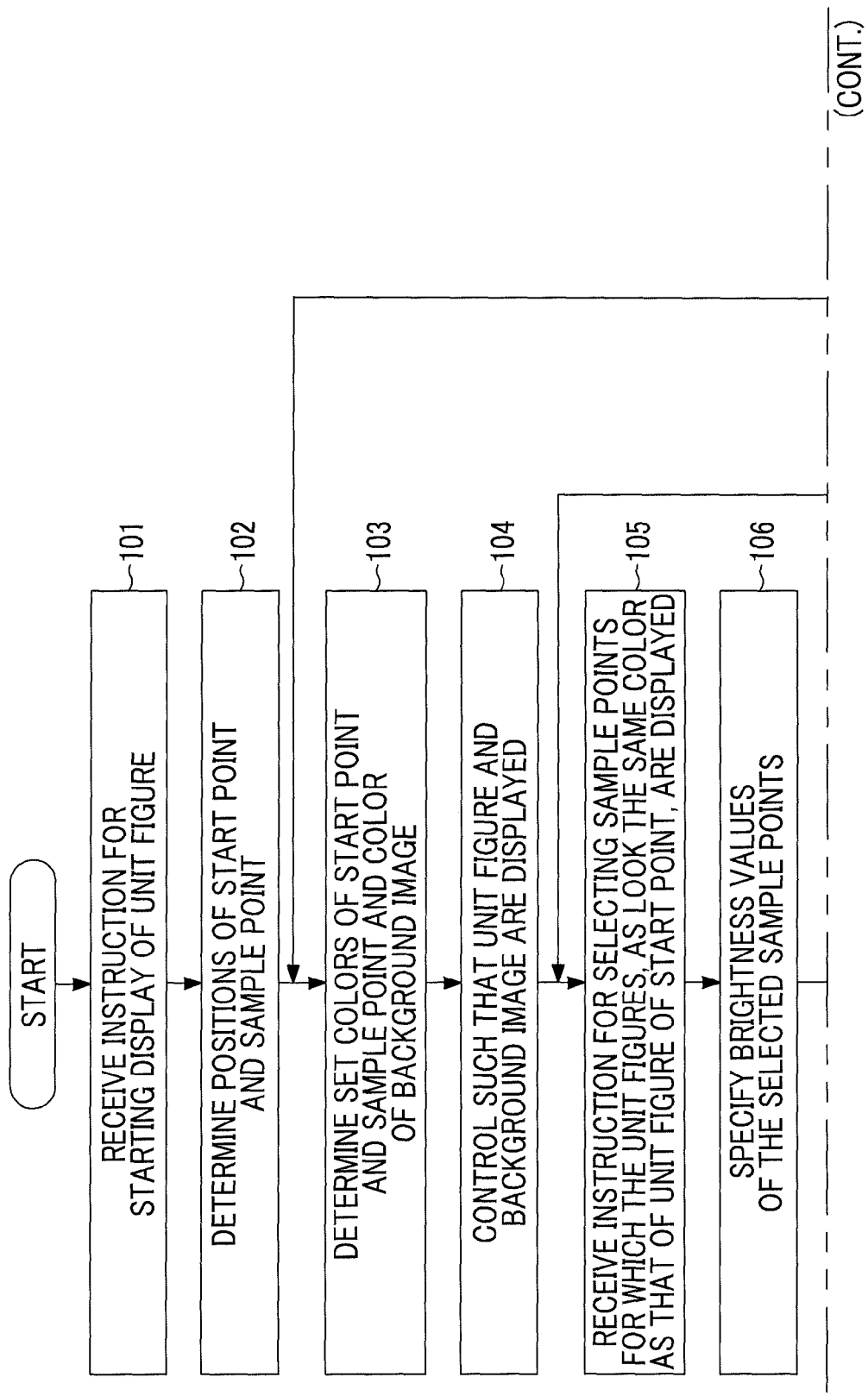

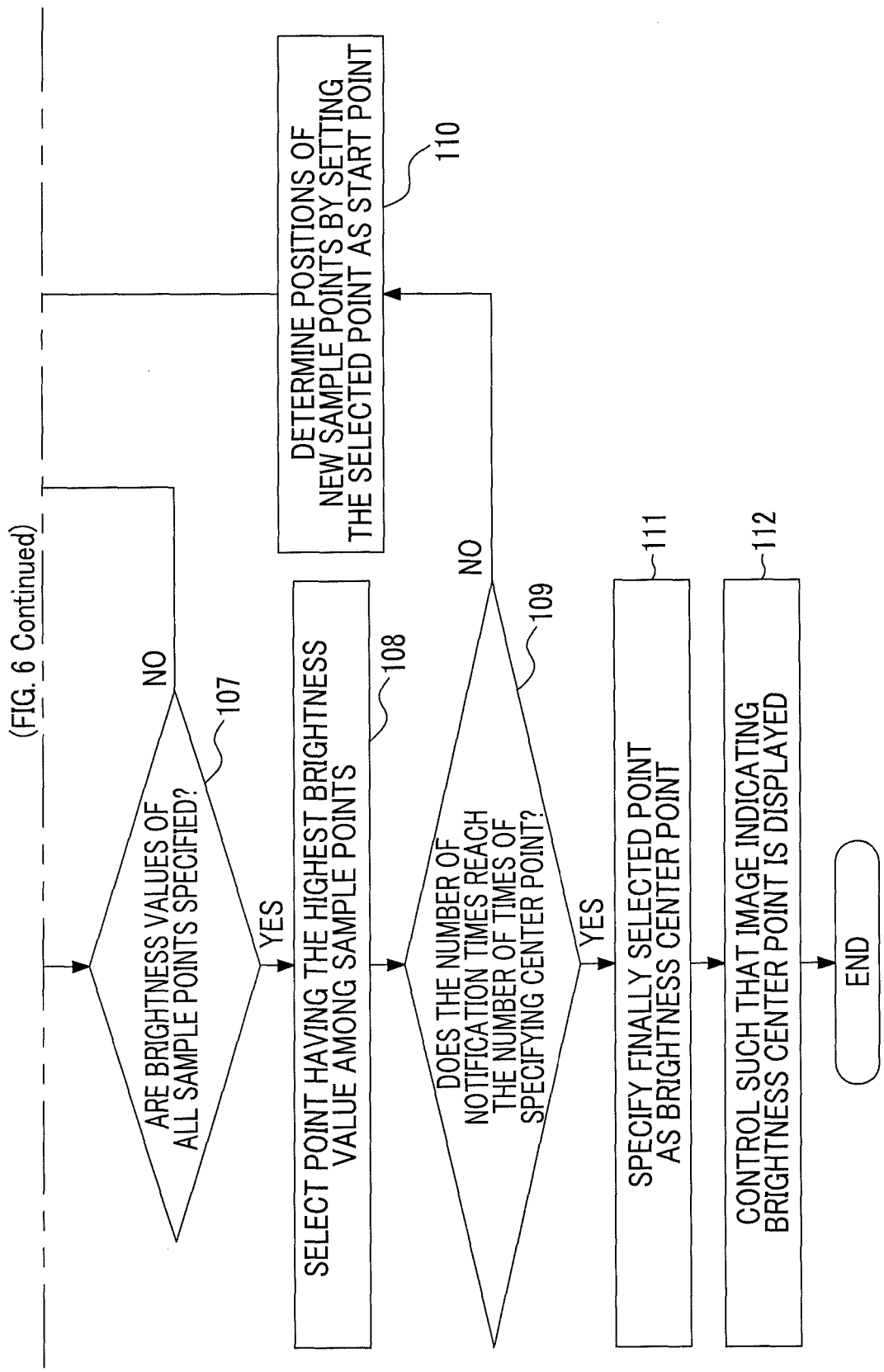

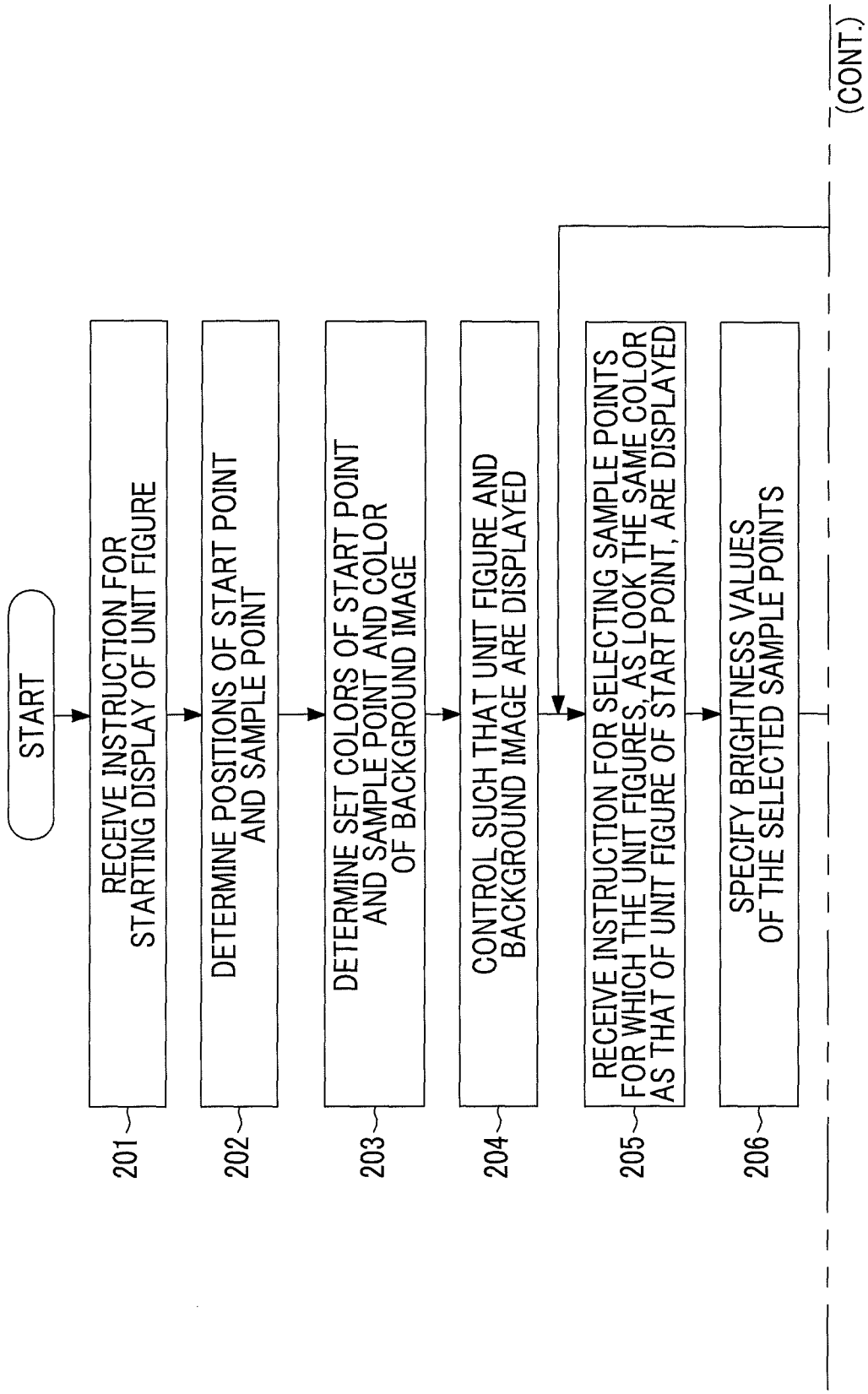

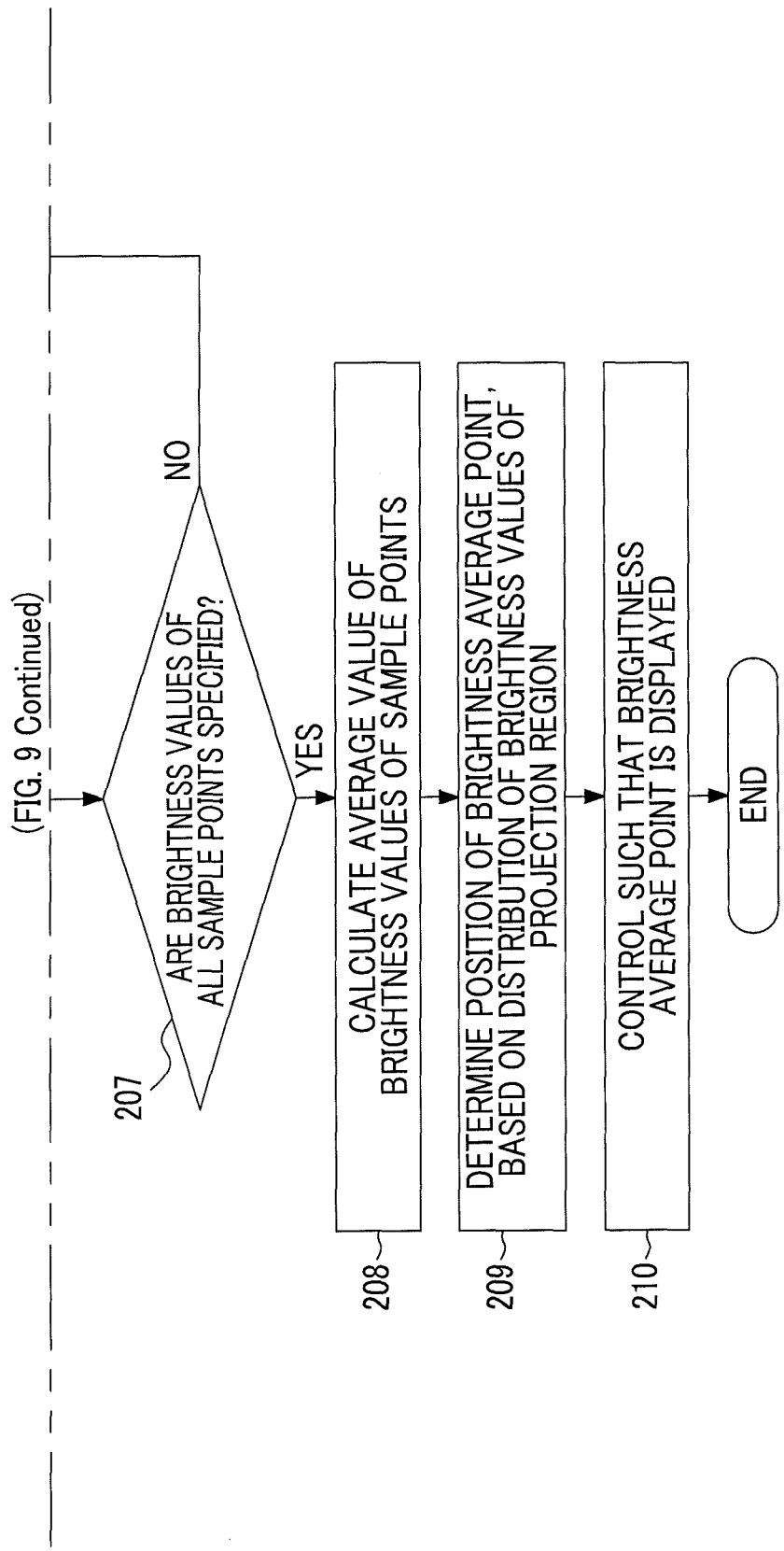

DISPLAY CONTROL DEVICE, METHOD, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2014-028662 filed Feb. 18, 2014.

BACKGROUND

Technical Field

The present invention relates to a display control device, a method, and a non-transitory computer readable medium storing a program.

SUMMARY

According to an aspect of the invention, there is provided a method including:

causing a projection apparatus that outputs projection light to a predetermined display area to project and display a first image including plural figures such that the plural figures are respectively displayed in plural positions of a projection area that is projected by the projection light;

specifying a figure of which brightness value is a maximum among the displayed plural figures so as to specify a brightness center point at which the brightness value is a maximum in the projection area; and causing the projection apparatus to project and display a second image indicating the specified brightness center point.

BRIEF DESCRIPTION OF THE DRAWINGS

Exemplary embodiments of the present invention will be described in detail based on the following figures, wherein:

FIG. 6 is a flowchart illustrating an example of a procedure for displaying an image indicating the brightness center point;

FIG. 9 is a flowchart illustrating an example of a procedure for determining the position of the brightness average point.

DETAILED DESCRIPTION

Hereinafter, the embodiments of the present invention will be described in detail with reference to accompanying drawings.

First Exemplary Embodiment

Description Regarding System Configuration

Figure 1:
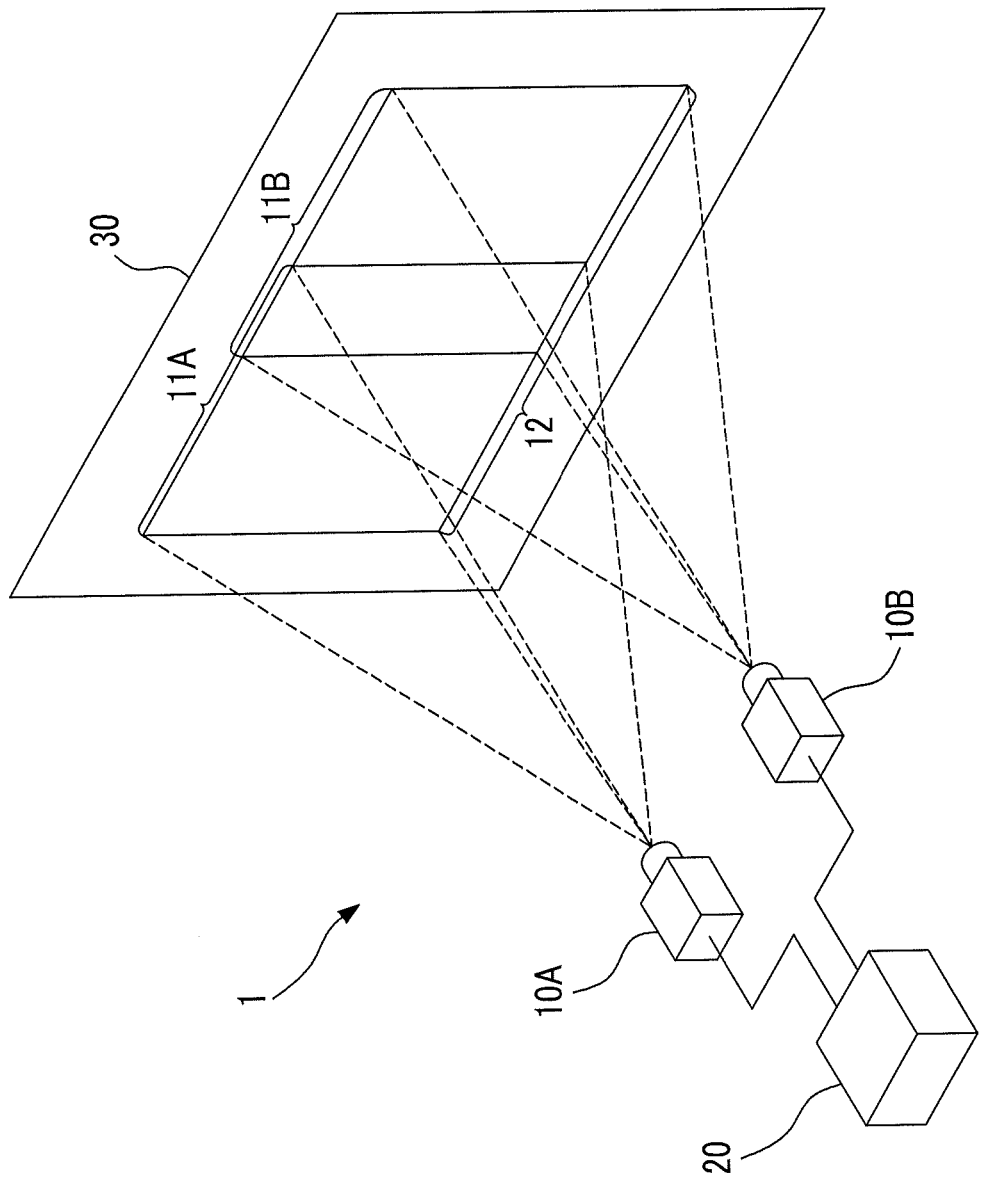
FIG. 1 is a diagram illustrating an example of a schematic configuration of a display system according to the present exemplary embodiment.

First, the overall configuration of a display system 1 according to the present exemplary embodiment will be described. FIG. 1 is a diagram illustrating an example of a schematic configuration of the display system 1 according to the present exemplary embodiment. The display system 1 includes plural projectors 10 (two projectors are prepared in the present exemplary embodiment) that output projection light to a screen 30 so as to project an image, and a display control device 20 that outputs information indicating a position of the brightest point (point at which brightness is a maximum) within an area that is projected on the screen 30 by the projection light (hereinafter, referred to as a projection area). Further, in the present exemplary embodiment, the display system 1 includes a first projector 10A and a second projector 10B, as the plural projectors 10.

The projector 10 as an example of a projection apparatus outputs projection light to the screen 30 so as to project an image, based on image data transmitted from a personal computer (not shown) or the display control device 20. In the present exemplary embodiment, a projection area 11A projected by the first projector 10A and a projection area 11B projected by the second projector 10B are displayed on the screen 30. If there is no need to distinguish between the projection area 11A and the projection area 11B, they are referred to as a projection area 11 in the following description.

Further, it is assumed that an area projected on the screen 30, in which an image is displayed, is referred to as a display area 12. In other words, a part of the screen 30 is the display area 12, and for example, when only one first projector 10A is used for projection, the projection area 11A and the display area 12 indicate the same area. In contrast, as illustrated in FIG. 1, when the plural projectors 10 are used, an area obtained by adding the respective projection areas 11 of the respective projectors 10 is the display area 12. Further, there is a difference in the light amount in the projection area 11 in such a manner that a light amount is reduced by being away from the center of the projection light (to the end side of the projection area 11), and thus it is assumed that unevenness of brightness occurs in the projection area 11 of each projector 10. However, the center of the projection light that is output from the projector 10 is a point at which brightness is a maximum in the projection area 11 (hereinafter, referred to as a brightness center point).

The display control device 20 outputs information indicating the position of the brightness center point in the projection area 11 to each projector 10, as will be described in detail later. Here, the display control device 20 controls the projector 10 so as to respectively display plural figures (hereinafter, referred to as unit figures) in plural positions of the projection area 11. The unit figures are displayed at the respective positions of a start point which is a reference point of a brightness value and sample points of which brightness values are compared with the brightness value of the start point by the operator. In the present exemplary embodiment, an image including plural unit figures is used as an example of a first image.

Then, the brightness values of respective sample points are specified, by the operator visually comparing colors (brightness) of the respective unit figures that are displayed at the start point and the sample point. Here, the sample point which is visually determined as being bright may be a sample point at which the brightness value of the reflected light of the projection light is high. Then, the brightness value of the reflected light of the projection light is a maximum at the brightness center point of which the brightness value is a maximum. However, the brightness value specified in the present exemplary embodiment is a value indicating relative brightness between the start point and the sample point. In the present exemplary embodiment, the specified brightness value is used as an example of a degree of brightness. Further, in the present exemplary embodiment, the position of the start point is defined as an example of the reference position, and the position of the sample point is defined as an example of the object position. Further, in the present exemplary embodiment, the unit figure is used as an example of the reference figure and the object figure.

Further, the display control device 20 selects a point having the highest brightness value among the sample points, based on the brightness value of each specified sample point, and determines the position of the sample point such that new sample points are arranged in the vicinity of a new start point by setting the selected point as the new start point. The display control device 20 repeats the selection of such a sample point having a high brightness value so as to finally specify the brightness center point in the projection area 11. Then, the display control device 20 sets a position to which the center of the projection light of the projector 10 is directed to a position (direction) as it is when the brightness center point is specified, and causes an image indicating a position of the projection area 11 at which the brightness center point is present to be displayed. As described above, since the brightness value is a maximum at the center of the projection light which is output from the projector 10, the image indicating the brightness center point is displayed, and thus the operator may ascertain a position at which the center of the projection light of the projector 10, which is an object, is present at the time point. In the present exemplary embodiment, an image indicating the brightness center point is used as an example of a second image.

Further, the operator specifies a point (hereinafter, referred to as a target center point) which is targeted as a position directing the center of the projection light in the display area 12. The target center point is determined by the operator based on the number of the projectors 10, the size of the display area 12 of a projection destination, or the like, and the operator clarifies the position indicating the target center point which is determined based on the information by putting a mark on the screen 30. Since the target center point is a point which is a target of a position directing the center of the projection light, the operator adjusts the position of the projector 10 such that the brightness center point overlaps the target center point. At this time, after comparing the image indicating the brightness center point which is projected and displayed by the projector 10 with the position of the target center point specified by the operator, the operator adjusts the position (direction) of the projector 10 such that the displayed brightness center point is superimposed on the position of the specified target center point.

Description Regarding Functional Configuration of Display Control Device

Figure 2:
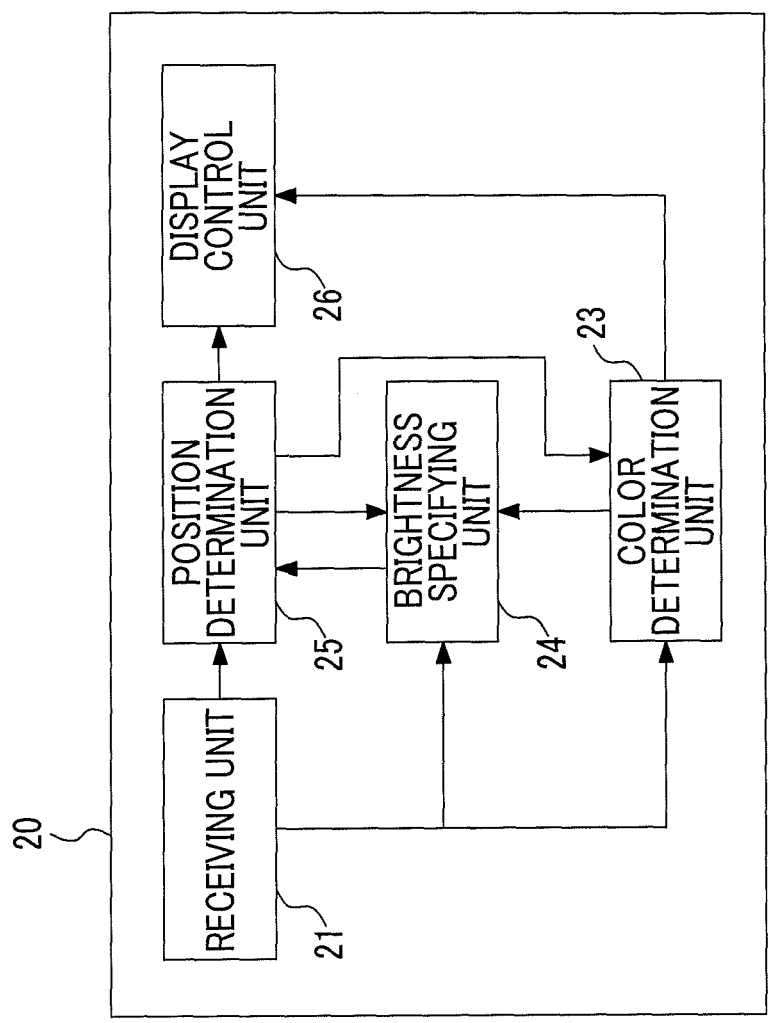
FIG. 2 is a block diagram illustrating a functional configuration example of a display control device according to the present exemplary embodiment.

Subsequently, the functional configuration of the display control device 20 will be described. FIG. 2 is a block diagram illustrating a functional configuration example of the display control device 20 according to the present exemplary embodiment.

The display control device 20 includes a receiving unit that receives an input by the operator and a color determination unit 23 that determines colors to be set in the unit figures displayed at the start point and the sample point and colors of the background. Further, the display control device 20 includes a brightness specifying unit 24 that specifies the brightness value of each sample point, a position determination unit 25 that determines the positions of the start point and the sample point, and a display control unit 26 that controls the projector 10 so as to display an image on the screen 30.

The receiving unit 21 as an example of a receiving unit receives an instruction for outputting information indicating the position of the brightness center point in the projection area 11, from the operator.

Here, when the unit figure is not yet displayed in the projection area 11, the receiving unit 21 receives an instruction for starting the display of the unit figure, as an instruction from the operator. If the instruction for starting the display of the unit figure is received, the receiving unit 21 outputs the received instruction to the color determination unit 23 and the position determination unit 25.

Further, when the unit figure is displayed in the projection area 11, the receiving unit 21 receives an instruction for selecting a sample point at which the color of the unit figure displayed at the sample point looks the same as the color of the unit figure displayed at the start point, as an instruction from the operator. In the following description, the color of the unit figure that is visually identified by the operator in this manner may be referred to as a visual color. If the instruction for selecting the sample point is received, the receiving unit 21 outputs the received instruction to the color determination unit 23 and the brightness specifying unit 24.

Further, when the unit figure is displayed in the projection area 11, the receiving unit 21 receives an instruction for changing the color that is set in the unit figure (hereinafter, the color that is set in the unit figure is referred to as a set color) of the start point or the sample point, as an instruction from the operator. Here, when the color (visual color) of the unit figure displayed at the sample point does not look the same as the color (visual color) of the unit figure displayed at the start point, the operator inputs the instruction for changing the set color of the unit figure at the start point or the sample point. If the instruction for changing the set color of the unit figure is received, the receiving unit 21 outputs the received instruction to the color determination unit 23.

The color determination unit 23 as an example of the color setting unit determines the set colors of the unit figure at the start point and the sample point and the color of a background image which is the background of the unit figure. Here, if the instruction for starting the display of the unit figure is received from the receiving unit 21, and the positions of the start point and the sample point are determined by the position determination unit 25, the color determination unit 23 determines the set colors of all unit figures at the start point and the sample point to be the same color as a predetermined color. Further, the color determination unit 23 determines the color of the background image as a color different from that of the unit figure.

Further, if the positions of a new start point and a new sample point are determined by the position determination unit 25, the color determination unit 23 determines the set colors of all unit figures at the new start point and the new sample point to be the same color as a predetermined color, and determines the color of the background image to be a color different from that of the unit figure. Further, if the instruction for changing the set color of the unit figures from the receiving unit 21 is received, the color determination unit 23 determines to change the set color of the unit figures into the instructed color.

If the set color of the unit figure and the color of the background image is determined, the color determination unit 23 outputs information on the determined set color of the unit figure to the brightness specifying unit 24 and the display control unit 26, and outputs the information on the determined color of the background image to the display control unit 26.

The brightness specifying unit 24 as an example of a specifying unit specifies the brightness value of each unit figure, that is, the brightness value of each sample point. Here, the brightness specifying unit 24 acquires the information on the set colors of the unit figures at the start point and the sample point from the color determination unit 23 and acquires the information on the positions of the start point and the sample point from the position determination unit 25. Then, if the instruction for selecting the sample points is received from the receiving unit 21, the brightness specifying unit 24 specifies the brightness values of the selected sample points (unit figures), based on the set color of the unit figures at the start point and the sample point.

Further, the brightness values of all sample points (unit figures) within the projection area 11 are specified, the brightness specifying unit 24 selects the point (unit figure) having the highest brightness value among the sample points (unit figures), and notifies the selected point (or point at which the selected unit figure is located) to the position determination unit 25, The position determination unit 25 as an example of the position determination unit determines the positions of the start point and the sample point at which the unit figures are displayed. The sample points are arranged so as not to overlap the start point.

Here, if the instruction for starting the display of the unit figure is received from the receiving unit 21, the position determination unit 25 determines the positions of one start point and at least one sample point as the point at which the unit figures are displayed. Then, position determination unit 25 outputs the information on the positions of the determined start point and sample points to the color determination unit 23, the brightness specifying unit 24 and the display control unit 26.

Further, when the point having the highest brightness value is notified from the brightness specifying unit 24, the position determination unit 25 determines the sample point, that is notified as the point having the highest brightness value, as the new start point, and determines the position of the sample point such that at least one new sample point is arranged in the vicinity of the new start point. Then, the position determination unit 25 outputs the information on the positions of the newly determined start point and sample point to the color determination unit 23, the brightness specifying unit 24 and the display control unit 26.

Further, when the point having the highest brightness value that is notified from the brightness specifying unit 24 satisfies the predetermined condition, the position determination unit 25 specifies the point having the highest brightness value as the brightness center point. Then, the position determination unit 25 outputs the information on the position of the specified brightness center point to the display control unit 26.

The display control unit 26 as an example of a first display control unit and a second display control unit controls the projector 10 so as to display the unit figures and the background image based on the information on the positions of the start point and the sample point that are input from the position determination unit 25, the information on the set color of each unit figure and the information on the color of the background image, that are input from the color determination unit 23. Here, the display control unit 26 controls the projector 10 so as to respectively display the plural unit figures at plural positions in the projection area 11, and the background image at the background of the unit figure.

Further, if the information on the position of the brightness center point is received from the position determination unit 25, the display control unit 26 controls the projector 10 so as to display the image indicating the brightness center point, based on the received information on the position of the brightness center point.

Description Regarding Target Center Point

Figure 3A:
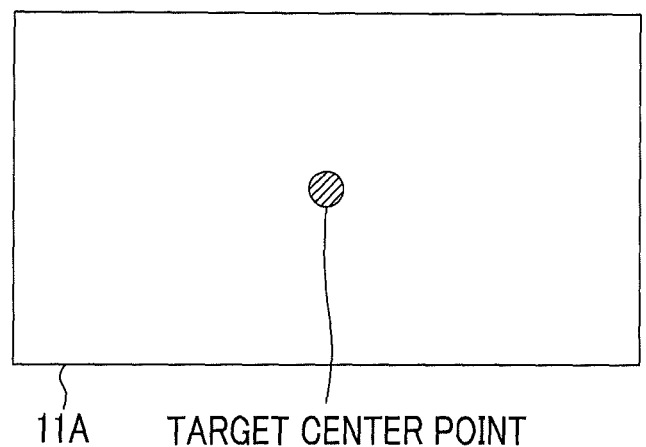
FIGS. 3A and 3B are diagrams for explaining an example of a target center point.
Figure 3B:
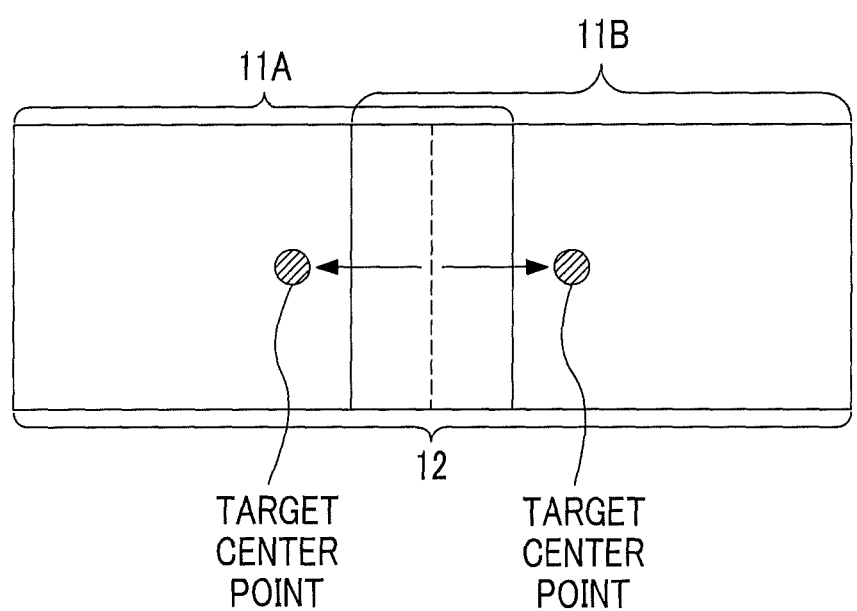

Subsequently, the target center point in the projection area 11 will be described. FIGS. 3A and 3B are diagrams for explaining examples of the target center point. FIG. 3A is a diagram illustrating an example of the target center point in the display area 12 (in other words, the projection area 11A) by one projector 10 of the first projector 10A, and FIG. 3B is a diagram illustrating an example of the target center point in the display area 12 (in other words, the projection area 11A and the projection area 11B) by two projectors 10 of the first projector 10A and the second projector 10B.

In the example illustrated in FIG. 3A, the target center point is determined as the center position of the projection area 11A such that the brightness value of the center of the projection area 11A (display area 12) is a maximum. Further, in the example illustrated in FIG. 3B, the target center point is determined as a position shifted to the right (or left) from the center (broken line) of the display area 12 obtained by adding the projection area 11A and the projection area 11B, which are two projection areas, based on the size of the screen 30 of the projection destination or the size of an overlapping area of the projection areas 11 that is adjusted in accordance with the size of the screen 30, and the like. In this manner, the target center point is determined by the operator, based on the number of used projectors 10, the size of the display area 12 of the projection destination, the size of the overlapping area of the projection area 11, and the like. The operator may put a mark on the screen 30 for preparation in order to clarify the position of the target center point.

Description Regarding Procedure for Specifying Brightness Value

Figure 4A:
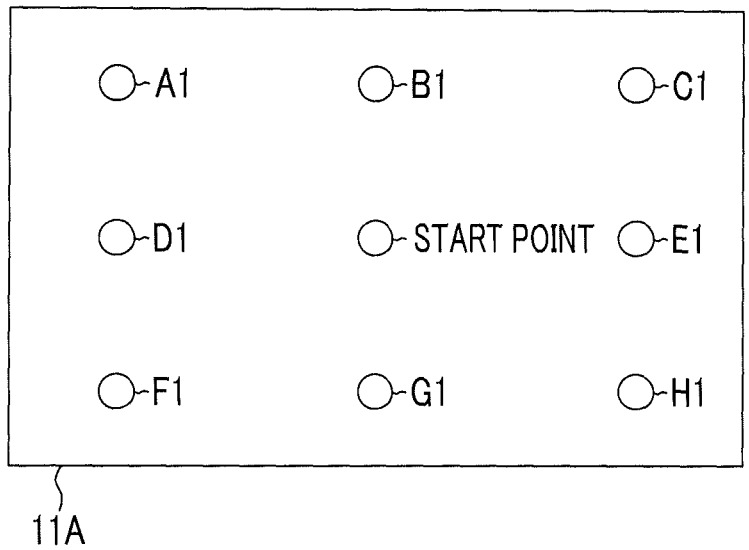
FIGS. 4A to 4C are diagrams for explaining an example of a procedure for specifying brightness.
Figure 4B:
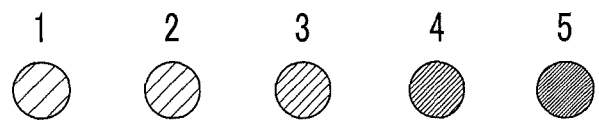
Figure 4C:
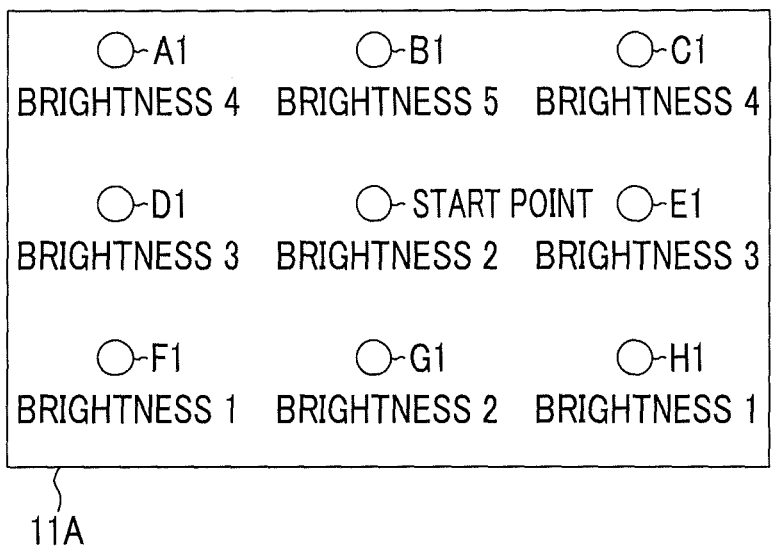

Subsequently, a procedure by which the display control device 20 specifies the brightness value of the sample point will be described. FIGS. 4A to 4C are diagrams describing an example of a procedure for specifying a brightness value.

Since unevenness of brightness occurs in the projection areas 11 of the respective projectors 10, the brightness values of the start point and the respective sample points may be different. If the brightness values of the respective points are different, even if the unit figures having the same set color are displayed at the respective points, the colors (visual colors) of the unit figures displayed on the screen 30 look respectively different to the operator. Thus, in the present procedure, the operator inputs the instruction for changing the set colors of the unit figures at the start point and the sample point, and compares the visual color of the unit figure of the start point and the visual color of the unit figure of the sample point at each time of input, such that the brightness values of the respective sample points are specified by the display control device 20.

Further, the brightness value is specified for each of the projectors 10. In other words, in the present exemplary embodiment, the brightness value is specified in each of the first projector 10A and the second projector 10B. In the following description, a case of specifying the brightness value for the first projector 10A will be described as an example.

If the instruction for starting the display of the unit figure is input by the operator, the position determination unit 25 determines the positions of one start point and at least one of the sample points. Here, for example, the positions of the respective points are determined such that the start point and the sample points are spread evenly in the projection area 11A by the first projector 10A. FIG. 4A is a diagram of an example illustrating the positions of the start point and sample points, which are first determined. In the example illustrated in FIG. 4A, the start point is determined as the center of the projection area 11A, and the sample points (point A1 to point H1) are set in the vicinity of the start point. However, the position of the start point determined in this case may be the center or the end of the projection area 11A.

Further, the unit figures having the set color that is determined by the color determination unit 23 are displayed at the start point and the sample points. FIG. 4B is a diagram illustrating an example of the set colors of the unit figures. As illustrated, for example, any gray color having five divided stages of brightness (respective colors are defined as "1" to "5" where "1" is the brightest) is set in the unit figures. When the instruction for starting the display of the unit figure is input, the color determination unit 23 determines all set colors at the start point and the sample points to be the same color as a predetermined color, but in this case, it is assumed that the unit figures having a color of "2" are displayed at all points illustrated in FIG. 4A.

Subsequently, the operator selects the sample points at which the unit figures that look the same color as the visual color of the unit figure of the start point is displayed. If the instruction for selecting the sample point is input, the brightness specifying unit 24 specifies the brightness value of the selected sample point as, for example, "brightness value 2". Here, the set color of the unit figure of the start point is "2", and the set color of the unit figure of the selected sample point also is "2", and the visual colors of both the unit figures are the same in this state. Therefore, it may be said that the brightness value of the start point and the brightness value of the selected sample point are the same, and the brightness specifying unit 24 may specify the brightness value of the start point also as "brightness value 2". In the example illustrated in FIG. 4A, the brightness values of the start point and a point G1 are specified as "brightness value 2".

Subsequently, the operator fixes the set color of the unit figure of the start point, inputs an instruction for changing the set colors of the unit figures displayed at the sample points other than "brightness value 2" into "3" that is darker than "2", and compares the visual color of the unit figure of the start point with the visual color of the unit figure of the sample point after the change. Then, the operator selects the sample point at which the unit figure looks the same color as the visual color of the unit figure of the start point. Here, the set color of the unit figure of the selected sample point is "3" which is darker than "2" which is the set color of the unit figure of the start point, and the visual colors of both the unit figures are the same in this state. Therefore, it may be said that the selected sample point is brighter than the start point (brightness value is high). In other words, if it is assumed that the brightness value of the sample point is "brightness value 3", it may be said that the sample point of "brightness value 3" is brighter than the start point. In the example illustrated in FIG. 4A, the brightness values of a point D1 and a point E1 are specified as "brightness value 3".

In this manner, the operator fixes the set color of the unit figure of the start point, inputs an instruction for changing the set colors of the unit figures displayed at the sample points other than "brightness value 2" and "brightness value 3" to "4" which is darker than "3", and thus the sample point indicating "brightness value 4" is specified. Thereafter, when there is a sample point of which brightness value has not yet been specified, subsequently, the operator inputs an instruction for changing the set color of the unit figure displayed at the sample point into "5" which is darker than "4", and thus the sample point indicating "brightness value 5" is specified.

Further, with respect to the sample point that is darker than the start point, the operator may change the set color of the unit figure of the sample point to "1" which is brighter than "2", and compare the set color with the visual color of the unit figure of the start point. In the example illustrated in FIG. 4A, the brightness values of a point F1 and a point H1 are specified as "brightness value 1", the brightness values of the point A1 and the point C1 are specified as "brightness value 4", and the brightness value of the point B1 is specified as "brightness value 5". FIG. 4C is a diagram illustrating an example of brightness values that are specified in the respective points. Through the above process, the brightness values of the respective sample points are specified.

Further, in the present procedure, the operator fixes the set color of the unit figure of the start point and changes the set color of the unit figure of the sample point for specifying the brightness value, but may input an instruction for fixing the set color of the unit figure of the sample point and changing the set color of the unit figure of the start point in order.

Further, when the set color of the unit figure is gray as in the present procedure, it is considered that the color of the background image of the projection area 11A is set as a darker color such as a black color by which the difference between the visual color of the unit figure and the color of the background image is easily determined. However, when there is external light, it is more difficult to determine the difference between the visual colors, and thus the color of the background may be a color of high saturation such as a red color or a green color in order to suppress the influence of the external light.

Description Regarding Procedure for Specifying Brightness Center Point

Figure 5A:
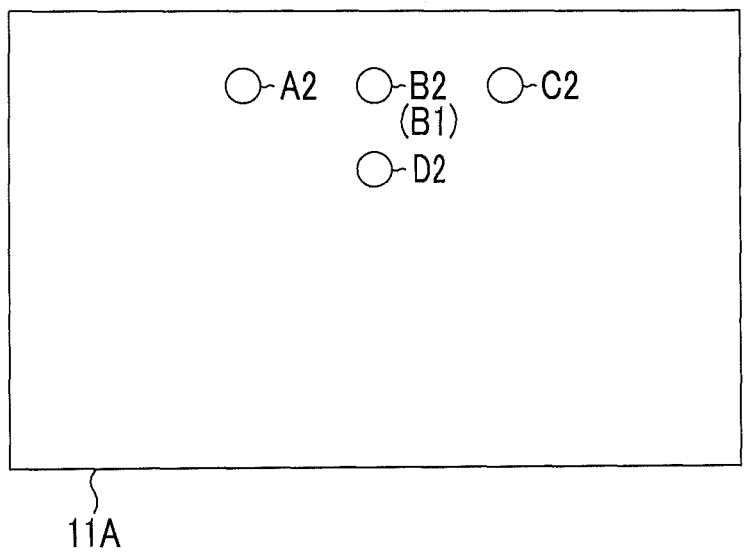
FIGS. 5A and 5B are diagrams for explaining an example of a procedure for specifying a position of a brightness center point.
Figure 5B:
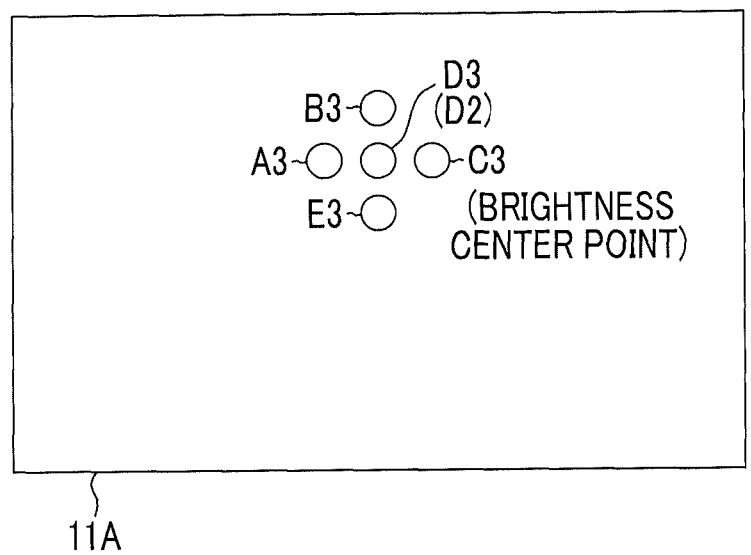

Subsequently, a procedure by which the display control device 20 specifies the position of the brightness center point will be described. The process of specifying the brightness center point is performed by each projector 10, similarly to the specifying of the brightness value. FIGS. 5A and 5B are diagrams describing an example of a procedure for specifying the position of the brightness center point. In the example that will be illustrated later, a predetermined condition by which the position determination unit 25 specifies the brightness center point is set as a condition determining whether the number of times when the point having the highest brightness value is notified from the brightness specifying unit 24 reaches a predetermined number of times (hereinafter, the predetermined number of times is referred to as the number of times of specifying the center point).

Further, a case where the position of the brightness center point with respect to the first projector 10A is specified will be described later. Further, as a result of setting an initial state such that one start point and one or more sample points are evenly spread within the projection area 11A as illustrated in FIG. 4A, it is assumed that the brightness values of the respective sample points are specified as illustrated in FIG. 4C.

First, since the brightness values of all the sample points within the projection area 11A are specified, the brightness specifying unit 24 selects the point having the highest brightness value among the sample points, and notifies the selected point to the position determination unit 25. In the example illustrated in FIG. 4C, since the sample point B1 has the brightest brightness value of "brightness value 5", the brightness specifying unit 24 selects the point B1. Then, if the selection of the sample point B1 is notified to the position determination unit 25, the position determination unit 25 determines the positions of the sample points such that new sample points are arranged in the vicinity of the point B1, by setting the point B1 as the start point. Here, the position determination unit 25 determines the positions of the new sample points such that the intervals between the new sample points and start point is narrower than the intervals between the start point and the sample points illustrated in FIG. 4C.

FIG. 5A is a diagram of an example illustrating the positions of respective points when the point B2 (point B1 in FIG. 4C) is set as the start point. In the example of FIG. 5A, the point A2, the point C2, and the point D2 are set as the sample points in the vicinity of the point B2. Here, for example, the display interval between the point A2 and the point B2, illustrated in FIG. 5A, is narrower than the display interval between the point A1 and the point B1, illustrated in FIG. 4C. Then, the brightness specifying unit 24, similarly to the respective points illustrated in FIG. 4C, specifies the brightness values of the respective sample points illustrated in FIG. 5A, and selects the point having the highest brightness value among the sample points illustrated in FIG. 5A. Here, it is assumed that the sample point D2 is selected as the point having the highest brightness value.

Subsequently, if the sample point D2 is notified to the position determination unit 25, the position determination unit 25 determines the positions of the sample points such that new sample points are arranged in the vicinity of the point D2, by setting the point D2 as the start point. FIG. 5B is a diagram of an example illustrating the positions of respective points when the point D3 (point D2 in FIG. 5A) is set as the start point. In the example illustrated in FIG. 5B, the points A3 to C3 and the point E3 are set as the sample points in the vicinity of the point D3. Here, for example, the display interval between the point B3 and the point D3, illustrated in FIG. 5B, is narrower than the display interval between the point B2 and the point D2, illustrated in FIG. 5A. Then, the brightness specifying unit 24 specifies the brightness values of the respective sample points illustrated in FIG. 5B, and selects the point having the highest brightness value among the sample points. Here, it is assumed that the sample point C3 is selected as the point having the highest brightness value.

Subsequently, for example, when the number of times of specifying the center point is three, by the notification of the sample point C3, the number of times when the sample points having the highest brightness value (point B1, point D2, and point C3) are notified reaches the number of times of specifying the center point, and thus the position determination unit 25 specifies the point C3 that is finally selected by the brightness specifying unit 24, as the brightness center point.

By doing so, the display control device 20 specifies the position of the brightness center point by repeatedly selecting a point having a high brightness value while reducing the interval between the start point and the sample point. Then, if the position of the brightness center point is specified, the display control unit 26 controls the projector 10 so as to display the image indicating the brightness center point on the screen 30. As the image indicating the brightness center point, images may be used by which the operator may ascertain a position in the projection area 11 at which the brightness center point is located. For example, in a state at which the image configured with the background image and the unit figures indicating the brightness center point and plural unit figures of which brightness values are measured are displayed, images in which the color of only the unit figure indicating the brightness center point is changed or only the unit figure indicating the brightness center point blinks, or the like is an example of the image indicating the brightness center point.

Further, in the present exemplary embodiment, since the projection areas 11 of the first projector 10A and the second projector 10B overlap, when an operator performs the specification of the brightness value and the specification of the brightness center point of the projector 10 on one side, the operator should perform the specification such that the projection area 11 of the projector 10 on the other side is not displayed on the screen 30. Meanwhile, for example, if the projection areas 11 of the first projector 10A and the second projector 10B do not overlap, the operator may perform the specification of the brightness value and the specification of the brightness center point of the respective projectors 10 in a state in which the projection areas 11 of both the projectors 10 are displayed on the screen 30.

Description Regarding Procedure of Displaying Image Indicating Brightness Center Point Subsequently, a procedure by which the display control device 20 displays an image indicating a brightness center point will be described. FIG. 6 is a flowchart illustrating an example of a procedure for displaying the image indicating the brightness center point. In the following description, a case where the display control device 20 displays the image indicating the brightness center point of the first projector 10A will be described as an example. Further, a state in which a unit figure is not yet displayed within the projection area 11A is assumed to be an initial state.

First, the receiving unit 21 receives an instruction for starting the display of a unit figure from an operator (step 101). Then, the receiving unit 21 outputs the received instruction to the color determination unit 23 and the position determination unit 25. Subsequently, if the instruction for starting the display of the unit figure is received from the receiving unit 21, the position determination unit 25 determines the positions of one start point and at least one of the sample points within the projection area 11A (step 102). Then, the position determination unit 25 outputs information on the determined positions of the start point and the sample points, to the color determination unit 23, the brightness specifying unit 24 and the display control unit 26.

Further, if the instruction for starting the display of the unit figure is received from the receiving unit 21 and the positions of the start point and the sample points are determined by the position determination unit 25, the color determination unit 23 determines the set colors of all of the start point and the sample points to be the same color as a predetermined color (step 103). Further, the color determination unit 23 determines the color of the background image to be a color different from that of the unit figure. Then, the color determination unit 23 outputs the information on the determined set color of the unit figure to the brightness specifying unit 24 and the display control unit 26, and outputs the information on the determined color of the background image to the display control unit 26.

Subsequently, the display control unit 26 controls the projector 10 so as to display the unit figure and the background image, based on the information on the positions of the start point and the sample point, which is input from the position determination unit 25, and the information on the set color of each unit figure and the information on the color of the background image which are input from the color determination unit 23 (step 104). In the present exemplary embodiment, step 104 corresponds to an example of a step of displaying a first image.

Subsequently, the receiving unit 21 receives an instruction for selecting the sample points for which the unit figures, that look the same color as the visual color of the unit figure of the start point, are displayed, as the instruction from the operator (step 105). Here, with respect to the sample points for which the unit figures, that do not look the same color as the visual color of the unit figure of the start point, are displayed, the operator inputs an instruction for changing the set colors of the unit figures of the sample points. Then, if the set color is changed and the changed set color looks the same as the visual color of the unit figure at the start point, the operator selects the sample point. Then, if the instruction for selecting the sample point is received, the receiving unit 21 outputs the received instruction to the brightness specifying unit 24.

If the instruction for selecting the sample points is received from the receiving unit 21, the brightness specifying unit 24 specifies the brightness values of the selected sample points, based on the set colors of the unit figures of the start point and sample points (step 106). Subsequently, the brightness specifying unit 24 determines whether or not the brightness values of all the sample points within the projection area 11A are specified (step 107). When the brightness values of all the sample points are specified (Yes in step 107), the brightness specifying unit 24 selects the point having the highest brightness value among the sample points (step 108), and notifies the selected points to the position determination unit 25. Meanwhile, when there is a sample point of which a brightness value is not yet specified (No in step 107), the process proceeds to step 105.

Subsequently, the point having the highest brightness value among the sample points is notified from the brightness specifying unit 24, and the position determination unit 25 determines whether the number of notification times reaches the number of times of specifying the center point (step 109). If the number of notification times does not reach the number of times of specifying the center point (No in step 109), the position determination unit 25 sets the point notified as having the highest brightness value, as a new start point, and determines the positions of the sample points such that new sample points are arranged in the vicinity of the new start point (step 110). Then, the position determination unit 25 outputs the information on the positions of the determined start point and sample points to the color determination unit 23, the brightness specifying unit 24 and the display control unit 26, and the process proceeds to step 103. Here, the color determination unit 23 determines the set colors such that the set colors of the unit figures of the respective points which are newly set are all the same colors.

Meanwhile, if the number of notification times reaches the number of times of specifying the center point (Yes in step 109), the position determination unit 25 specifies the point that is finally selected by the brightness specifying unit 24 as the brightness center point (step 111). Then, the position determination unit 25 outputs the information on the position of the specified brightness center point to the display control unit 26. The display control unit 26 controls the projector 10 so as to display the image indicating the brightness center point on the screen 30, based on the information on the position of the brightness center point that is input from the position determination unit 25 (step 112), and the flow of the present procedure ends. In the present exemplary embodiment, step 111 corresponds to an example of a step of specifying the brightness center point. Further, step 112 corresponds to an example of a step of displaying the image indicating the brightness center point.

Then, if the image indicating the brightness center point is displayed on the screen 30, the operator ascertains the position of the center of the projection light, from the displayed brightness center point. Further, the operator determines the target center point directing the center of the projection light, and adjusts the position (direction) of the projector 10 by moving the center of the projection light from the current position to the position of the target center point such that the displayed brightness center point overlaps the target center point. In the present exemplary embodiment, the procedure for determining the target center point corresponds to an example of a step of determining the second position. Further, a procedure for moving the center of the projection light to the position of the target center point corresponds to an example of a step of moving the center to the second position.

Explanation of Procedure for Moving the Center of Projection Light

Figure 7:
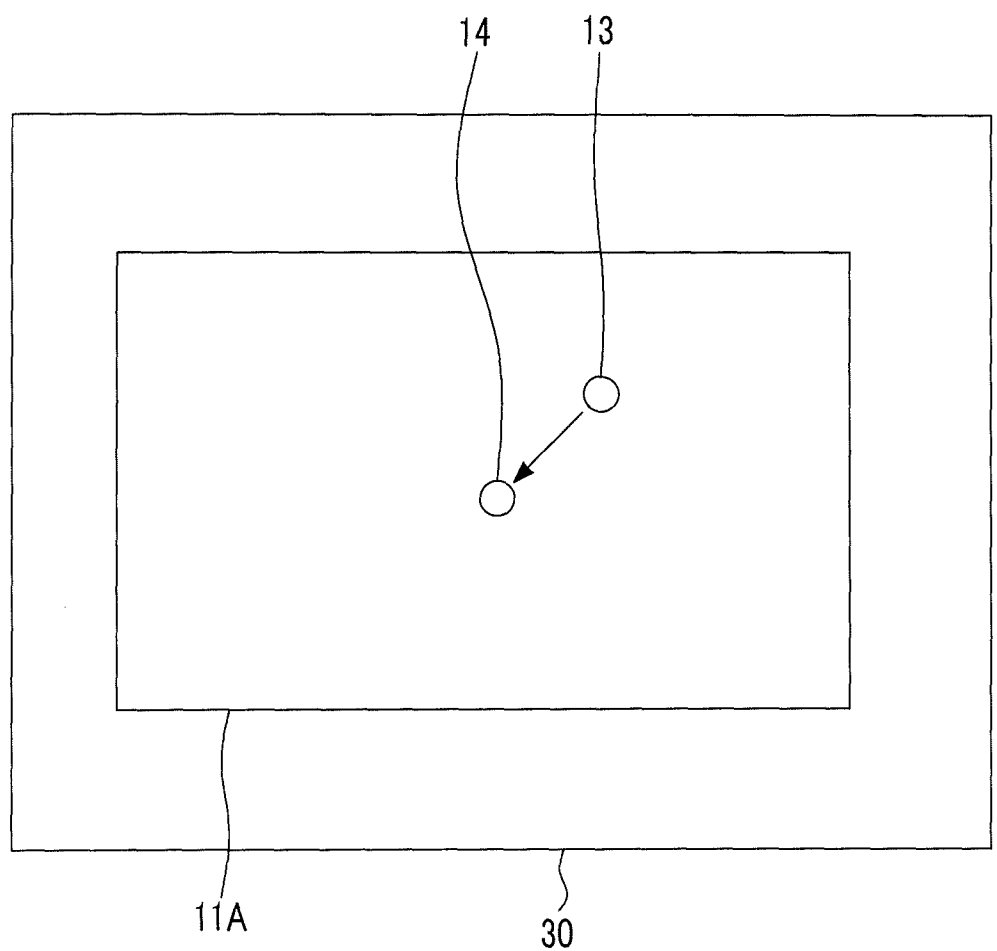
FIG. 7 is a diagram for explaining an example of a procedure for moving a center of projection light to the target center point, based on the image indicating the brightness center point.

FIG. 7 is a diagram for explaining an example of a procedure for moving a center of a projection light to the target center point, based on the image indicating the brightness center point. Further, a case where the display control device 20 displays an image indicating the brightness center point of the first projector 10A will be described later, as an example.

If the brightness center point within the projection area 11A is specified by the procedure illustrated in FIG. 6, the display control unit 26 controls the projector 10A so as to display the image indicating the brightness center point. In the example illustrated in FIG. 7, a FIG. 13 indicating the position of the brightness center point is displayed in the projection area 11A. Further, the operator determines the position of the target center point in advance based on the number of projectors 10, before moving the center of the projection light, and clarifies the position by attaching a mark on the screen 30. In the example illustrated in FIG. 7, it is assumed that the operator determines the position of FIG. 14 as the target center point. Then, the operator adjusts the position (direction) of the projector 10A such that the center of the projection light moves from the position of the FIG. 13 that is the current position to the position (the direction of the arrow) of the FIG. 14 that is the position of the target center point, based on the image indicating the brightness center point.

As described above, the display control device 20 according to the present exemplary embodiment sets the start point and sample points within the projection area 11, specifies the position of the brightness center point by specifying the brightness values of the sample points based on the visual inspection by the operator, and displays an image indicating the position in the projection area 11 at which the brightness center point is present. Although brightness unevenness occurs due to a difference between light amounts in the projection area 11 of the projector 10, in some cases, the brightness unevenness is increased due to, for example, an increase in the projection area 11 or the overlapping projection areas 11 caused by using plural projectors 10. Therefore, when installing the projector 10, the adjustment of the brightness unevenness is performed through adjustment of the direction of the projector 10 or a process of blending for adjusting the brightness value such that the boundary between the adjacent projection areas 11 becomes less noticeable when the projection areas 11 overlap.

The display control device 20 according to the present exemplary embodiment specifies the position of the brightness center point within the projection area 11 based on the visual inspection by the operator, and displays the image indicating the brightness center point. Therefore, the operator ascertains the position at which the center of the projection light is present, and thus an adjustment of moving the center of the projection light to a position of a target is easily performed. Further, for example, the status of the brightness unevenness is further easily ascertained and adjusted as compared to a configuration of acquiring information on brightness unevenness by measuring the brightness values of plural positions using two-dimensional measuring devices. Further, the status of the brightness unevenness is ascertained and adjusted using the low-cost configuration of the display control device 20, as compared to the case of using, for example, expensive two-dimensional measuring devices.

Further, in the present exemplary embodiment, although the brightness specifying unit 24 selects the point having the highest brightness value among the sample points and notifies the selected points to the position determination unit 25, for example, the point having the highest brightness value may be selected among the start point and the sample points.

Further, in the present exemplary embodiment, a predetermined condition by which the position determination unit 25 specifies the brightness center point is set as a condition determining whether the number of times when the point having the highest brightness value is notified from the brightness specifying unit 24 reaches the number of times of specifying the center point, but it is not intended to be limited to such a configuration. For example, a configuration may be possible in which when the point, that has been once the start point, is selected as a point having the highest brightness value, the position determination unit 25 determines the selected point as the brightness center point. Further, a configuration may be possible in which the operator may select the brightness center point based on the brightness value of the respect points.

Then, in the present exemplary embodiment, the receiving unit 21 receives the instruction for changing the set colors of the start point or the sample points as an instruction from the operator, but it is not intended to be limited to such a configuration. For example, when the color determination unit 23 determines different set colors at regular time intervals, a configuration may be possible in which the operator does not input an instruction, but the set colors of the start point and the sample points are automatically changed.

Further, in the present exemplary embodiment, the color of the unit figure is gray, but it is not intended to be limited to the configuration of only gray, and if the difference between a color and the visual color may be identified, the color may be, for example, a yellow color, and the like other than gray.

Further, in the present exemplary embodiment, two projectors 10 project images to the screen 30, but it is not intended to be limited to such a configuration. For example, a configuration may be possible in which an image is projected on the screen 30 using one projector 10 or three or more projectors 10.

Second Exemplary Embodiment

The display control device 20 according to the first exemplary embodiment determines the position of the brightness center point based on the brightness values of the respective specified sample points. Meanwhile, the display control device 20 according to the second exemplary embodiment does not determine the position of the brightness center point, but determines the position of a point within the projection area 11, which is predicted that the brightness value thereof indicates a predetermined reference value, based on the brightness values of the respective specified sample points.

Here, when the operator acquires data regarding the characteristics of color to be output by, for example, the projector 10, even if the user measures the color while displaying patch images at points having high brightness values or points having low brightness values within the projection area 11, the brightness values of the points to be measured are shifted from the average, and thus in some cases, deviation occurs in the data, and the accuracy of the data regarding the output characteristic is lowered. Therefore, the display control device 20 according to the present exemplary embodiment determines, for example, the position of the point within the projection area 11, which is predicted that the brightness value thereof indicates an average (hereinafter, referred to as a brightness average point), as a point for measuring the characteristics of color that is output by the projector 10. Through the determination of the position of the brightness average point, the operator may acquire the data regarding the output characteristics at the point within the projection area 11, which is predicted that the brightness value thereof indicates an average. In the present exemplary embodiment, the average of the brightness values within the projection area 11 is determined as an example of a predetermined reference value. Further, in the following description, the same components as those of the first exemplary embodiment are denoted by the same reference numerals, and thus the detailed description thereof will be omitted.

Figure 8:
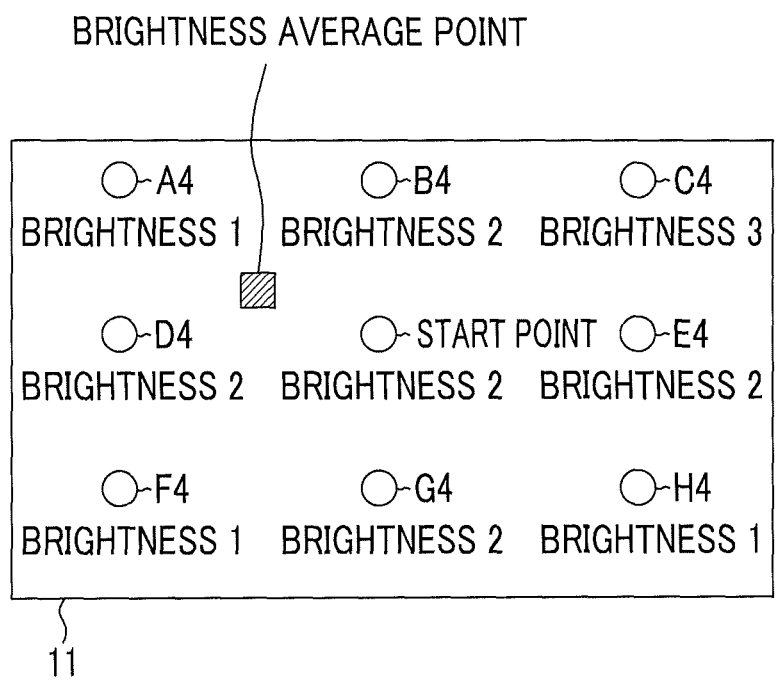
FIG. 8 is a diagram for explaining an example of a procedure for determining a position of a brightness average point.

FIG. 8 is a diagram for explaining an example of a procedure for determining a position of a brightness average point. If the brightness values of the respective sample points are specified by the same procedure as that described using FIGS. 4A to 4C, the brightness specifying unit 24 as an example of position specifying unit calculates the average value of the brightness values of the sample points. Further, since the brightness value continuously changes within the projection area 11, the brightness specifying unit 24 predicts the distribution of the brightness values within the projection area 11, based on the brightness values of the start point and the respective sample points. Then, the brightness specifying unit 24 specifies the position of the brightness average point indicating the average value of the brightness values, based on the distribution of the brightness values within the predicted projection area 11.

In the example illustrated in FIG. 8, the brightness values of the sample points (point A4 to point H4) are specified, and an average value of the brightness values of the sample points is calculated as 1.75 (=(1×3+2×4+3×1)/8). The brightness specifying unit 24 predicts the distribution of brightness values within the projection area 11 based on the brightness values of the start point and the points A4 to H4, and specifies the position of the point (brightness average point) at which the brightness value is 1.75. Here, the point indicated by an oblique line in FIG. 8 is the specified brightness average point.

FIG. 9 is a flowchart illustrating an example of a procedure for determining the position of the brightness average point. Since the processes of steps 201 to step 207 are similar to the processes of steps 101 to step 107 illustrated in FIG. 6, the description thereof will be omitted. Then, if positive determination (Yes) is made in step 207, in other words, when the brightness values of all sample points are specified, the brightness specifying unit 24 calculates the average value of the brightness values of the sample points (step 208).

Subsequently, the brightness specifying unit 24 predicts the distribution of brightness values within the projection area 11 from the brightness values of the start point and the sample point, and determines the position of the brightness average point, based on the predicted brightness distribution and the average value of the brightness values calculated in step 208 (step 209). Then, the brightness specifying unit 24 outputs information on the position of the determined brightness average point, to the display control unit 26. The display control unit 26 controls the projector 10 so as to display the brightness average point on the screen 30, based on the information on the position of the brightness average point that is input from the brightness specifying unit 24 (step 210), and the flow of the present procedure ends.

Further, since a point having an average value of the brightness values within the projection area 11 may be determined, the display control device 20 according to the present exemplary embodiment may not repeatedly perform the process of selecting sample points having high brightness values which is the procedure illustrated in FIG. 6 of the first exemplary embodiment. Meanwhile, even in the present exemplary embodiment, if the process of selecting the sample points having high brightness values is repeatedly performed, the processing time becomes long, but the number of sample points of which brightness values are specified increases, such that the position of the brightness average point is more accurately determined.

As described above, in the display control device 20 according to the present exemplary embodiment, the brightness values of the sample points are visually specified, such that the position of the point, which is predicted that the brightness value thereof indicates a predetermined reference value, is determined. If the display control device 20 determines the position of the brightness average point, information on the position of the brightness average point is further easily acquired, as compared to a configuration of, for example, specifying the position of the brightness average point by measuring brightness values of plural points using a two-dimensional measurement device. Further, the display control device 20 is used, such that, for example, information on the position of the brightness average point is acquired at a lower-cost as compared to a case of using an expensive two-dimensional measurement device. Then, the operator causes a patch image to be displayed at the position of the brightness average point using a personal computer (not shown), and the like, and the color of the displayed patch image is measured by a color measurement device (not shown), such that the data regarding the output characteristics of the projector 10 is acquired.

Further, in the present exemplary embodiment, the brightness specifying unit 24 calculates the average value of the brightness value of the sample points so as to specify the position of the brightness average point, but may calculate the average value of the brightness values of the start point and the sample point so as to specify the position of the brightness average point.

Further, in the present exemplary embodiment, it is assumed that the images are projected on the screen 30 by two projectors 10, but it is not intended to be limited to such a configuration. For example, similarly to the first exemplary embodiment, a configuration may be possible in which an image is projected on the screen 30 using one projector 10 or three or more projectors 10. Further, when data regarding color characteristics that is output from, for example, a large-scale display over 100 inches, not from the projector 10, is acquired, the display control device 20 may be used.

Description Regarding Applicable Computer

However, the processes of the display control device 20 according to the first exemplary embodiment and the second exemplary embodiment may be realized in a general-purpose computer. Thus, a hardware configuration will be described for realizing the processes in a computer.

Figure 10:
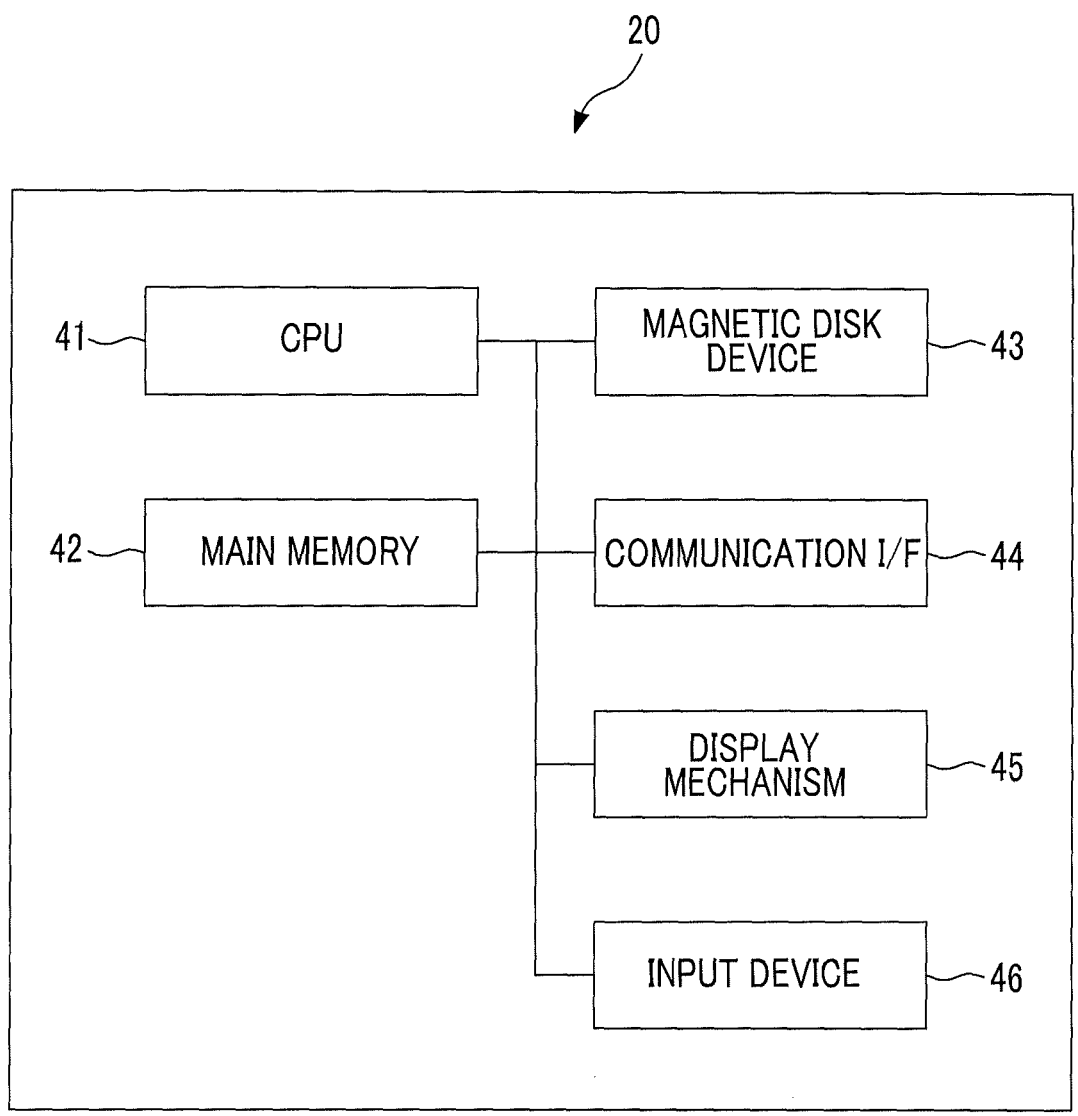
FIG. 10 is a diagram illustrating a hardware configuration example of the display control device according to the present exemplary embodiment of the present invention.

FIG. 10 is a diagram illustrating a hardware configuration example of the display control device 20 according to the exemplary embodiment of the present invention.

As illustrated, the display control device 20 includes a Central Processing Unit (CPU) 41 that is an arithmetic unit, a main memory 42 that is a storage unit, and a magnetic disk device (HDD: Hard Disk Drive) 43. Here, the CPU 41 executes various types of software such as an Operating System (OS) and applications so as to realize the respective functions described above. Further, the main memory 42 is a storage area for storing various types of software and data used for executing the software, and the magnetic disk device 43 stores programs for realizing the respective functions of the display control device 20. Then, the program is loaded into the main memory 42 and the process based on the program is executed by the CPU 41, such that the respective functions are realized. Further, the display control device 20 includes a communication I/F 44 for performing communication with the outside, a display mechanism 45 configured with a video memory, a display, and the like, and an input device 46 such as a key board and a mouse.

Specifically, in the display control device 20, the respective functions of the receiving unit 21, the color determination unit 23, the brightness specifying unit 24, the position determination unit 25, and the display control unit 26 according to the present exemplary embodiment are realized by, for example, the instructions from the CPU 41. Further, for example, the input to the receiving unit 21 is realized by the operator using the input device 46 with respect to the display contents displayed on the display mechanism 45.

Description Regarding Program

A process performed by the display control device 20 in the first exemplary embodiment and the second exemplary embodiment which are described above is prepared as, for example, a program such as application software.

Accordingly, the process performed by the display control device 20 is regarded as a program for causing a computer to realize a function of causing a projection apparatus that outputs projection light to a predetermined display area 12 to project and display a first image including plural figures such that the plural figures are respectively displayed in plural positions of a projection area 11 that is projected by the projection light; a function of specifying a figure of which brightness value is a maximum among the displayed plural figures so as to specify a brightness center point at which the brightness value is a maximum in the projection area 11; and a function of causing the projection apparatus to project and display a second image indicating the specified brightness center point.

In addition, a program for realizing the first exemplary embodiment and the second exemplary embodiment may be provided by communication units, and, of course, may be provided while being stored in a recording medium such as a CD-ROM.

Further, in the first exemplary embodiment and the second exemplary embodiment, the display control device 20 and the projector 10 are separate devices, but a configuration may be possible in which the projector 10 has the function of the display control device 20.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A method comprising:
causing, with a processor, a projection apparatus that outputs projection light to a predetermined display area to project and display a first image including a plurality of figures such that the plurality of figures are respectively displayed in a plurality of positions of a projection area that is projected by the projection light;
specifying, with the processor, a figure of which brightness value is a maximum among the displayed plurality of figures so as to specify a brightness center point at which the brightness value is a maximum in the projection area, the brightness center point stored in a memory; and
causing, with the processor that accesses the brightness center point stored in the memory, the projection apparatus to project and display a second image showing the specified brightness center point on the displayed second image to ascertain a position in the projection area at which the brightness center point is located.

2. A method comprising:
causing, with a processor, a projection apparatus that outputs projection light to a predetermined display area to project an image indicating a brightness center point at which the brightness value of reflected light with respect to the projection light when a center of the projection light is present at a first position is a maximum, the first position stored in a memory;
determining, with the processor, a second position that is a target of a position to which a center of the projection light in the display area is directed, the second position stored in the memory; and
moving, with the processor that accesses the first position and the second position stored in the memory, the center of the projection light projected by the projection apparatus from the first position to the second position such that the projected brightness center point overlaps the second position.

3. A method comprising:
causing, with a processor, a projection apparatus that outputs projection light to a predetermined display area to project and display a first image including a plurality of figures such that the plurality of figures are respectively displayed in a plurality of positions of a projection area that is projected by the projection light, in a state in which a center of the projection light is present at a first position;
specifying, with the processor, a figure of which brightness value is a maximum among the displayed plurality of figures so as to specify a brightness center point at which the brightness value is a maximum in the projection area, the brightness center point stored in a memory;
causing, with the processor that accesses the brightness center point stored in the memory, the projection apparatus to project and display a second image showing the specified brightness center point on the projection area in the state in which the center of the projection light is present at the first position on the displayed second image to ascertain a position in the projection area at which the brightness center point is located;
determining, with the processor, a second position that is a target of a position to which the center of the projection light in the display area is directed, the second position stored in a memory; and
ascertaining, with the processor, the first position that is the center of the projection light by the displayed brightness center point and moving, with the processor that accesses the second position stored in the memory, the center of the projection light projected by the projection apparatus from the first position to the second position such that the displayed brightness center point overlaps the second position.

4. A display control device comprising:
a first display control unit having a processor that causes a projection apparatus that outputs projection light to a predetermined display area to project and display a first image including a plurality of figures such that the plurality of figures are respectively displayed in a plurality of positions of a projection area that is projected by the projection light;
a specifying unit having a processor that specifies a figure of which brightness value is a maximum among the displayed plurality of figures so as to specify a brightness center point at which the brightness value is a maximum in the projection area, the brightness center point stored in a memory; and
a second display control unit having a processor that accesses the brightness center point stored in the memory to cause the projection apparatus to project and display a second image showing the specified brightness center point on the displayed second image to ascertain a position in the projection area at which the brightness center point is located.

5. The display control device according to claim 4, further comprising:
a position determination unit that determines one reference position, and at least one object position that is a comparing object of the reference position and arranged so as not to overlap the reference position, in the projection area; and
a color setting unit that sets a color of a reference figure displayed at the reference position and a color of an object figure displayed at the object position, and sets a color of a background image that is a background of the reference figure and the object figure in the projection area as a color different from the colors of the reference figure and the object figure,
wherein the first display control unit projects and displays the first image including the reference figure, the object figure, and the background image.

6. The display control device according to claim 5, further comprising:
a receiving unit that receives an input by an operator,
wherein when the position determination unit determines the reference position and the object position, the color setting unit sets the color of the reference figure and the color of the object figure as a predetermined color, and
wherein when the receiving unit receives an input of causing the color of the reference figure to look as the color of the object figure, the specifying unit specifies a degree of brightness of the object position at which the object figure is displayed, based on the color that is set in the reference figure and the color that is set in the object figure.

7. The display control device according to claim 6, further comprising:

a position specifying unit that specifies a position that is predicted that a degree of the brightness within the projection area indicates a predetermined reference value, based on the degree of the brightness of the object position specified by the specifying unit.

8. The display control device according to claim 6,
wherein the receiving unit receives an input of an instruction for fixing the color of any one of the reference figure and the object figure and for changing the color of the other one, with respect to the object figure to which the input of causing the color of the reference figure to look as the color of the object figure is not given, and
wherein the color setting unit changes the color of the reference figure or the object figure, based on the instruction for changing.

9. The display control device according to claim 8, further comprising:
a position specifying unit that specifies a position that is predicted that a degree of the brightness within the projection area indicates a predetermined reference value, based on the degree of the brightness of the object position specified by the specifying unit.

10. The display control device according to claim 8,
wherein the position determination unit determines a position having a highest brightness value among the object positions or among the reference position and the object position, as a new reference position, based on a degree of brightness of the object position specified by the specifying unit, and determines at least one new object position in the vicinity of the new reference position, and
wherein when the brightest position satisfies a predetermined condition, the specifying unit specifies the brightest position as the brightness center point in the projection area.

11. The display control device according to claim 10, further comprising:
a position specifying unit that specifies a position that is predicted that a degree of the brightness within the projection area indicates a predetermined reference value, based on the degree of the brightness of the object position specified by the specifying unit.

12. A non-transitory computer readable medium storing a program causing a computer to execute a process for display control, the process comprising:
causing, with the computer, a projection apparatus that outputs projection light to a predetermined display area to project and display a first image including a plurality of figures such that the plurality of figures are respectively displayed in a plurality of positions of a projection area that is projected by the projection light;
specifying, with the computer, a figure of which brightness value is a maximum among the displayed plurality of figures so as to specify a brightness center point at which the brightness value is a maximum in the projection area, the brightness center point stored in a memory; and
causing, with the computer that accesses the brightness center point stored in the memory, the projection apparatus to project and display a second image showing the specified brightness center point on the displayed second image to ascertain a position in the projection area at which the brightness center point is located.

* * * * *